United States Patent
Ekemark et al.

(10) Patent No.: US 9,924,492 B2
(45) Date of Patent: Mar. 20, 2018

(54) METHOD AND APPARATUSES FOR DETERMINING PRIORITY OF A WIRELESS TERMINAL

(71) Applicant: TELEFONAKTIEBOLAGET LM ERICSSON (PUBL), Stockholm (SE)

(72) Inventors: Sven Ekemark, Storvreta (SE); Tomas Brännlund, Sigtuna (SE); Magnus Hurd, Stockholm (SE); Lena Melin, Vaxholm (SE); Agnes Rensfelt, Bromma (SE); Martin Skarve, Enebyberg (SE); Mikael Söderström, Vallentuan (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/320,472

(22) PCT Filed: Jun. 30, 2014

(86) PCT No.: PCT/SE2014/050820
§ 371 (c)(1),
(2) Date: Dec. 20, 2016

(87) PCT Pub. No.: WO2016/003330
PCT Pub. Date: Jan. 7, 2016

(65) Prior Publication Data
US 2017/0164325 A1    Jun. 8, 2017

(51) Int. Cl.
*H04W 68/02*    (2009.01)
*H04W 72/04*    (2009.01)
(Continued)

(52) U.S. Cl.
CPC ............. *H04W 68/02* (2013.01); *H04W 8/18* (2013.01); *H04W 8/26* (2013.01); *H04W 68/005* (2013.01);
(Continued)

(58) Field of Classification Search
CPC ..... H04W 68/005; H04W 68/02; H04W 4/08; H04W 88/08; H04W 72/042; H04W 8/04
See application file for complete search history.

(56) References Cited

U.S. PATENT DOCUMENTS 7,912,471 B2 * 3/2011 Kodikara Patabandi ........... H04W 76/021 455/450
9,332,575 B2 * 5/2016 Johansson ............. H04W 76/02
(Continued)

FOREIGN PATENT DOCUMENTS

WO    2009075485 A1    6/2009
WO    2013100582 A1    7/2013
(Continued)

OTHER PUBLICATIONS

3GPP TS 23.272 V12.1.0, 3rd Generation Partnership Project; Technical Specification Group Services and System Aspects; Circuit Switched (CS) fallback in Evolved Packet System (EPS); Stage 2 (Release 12), Dec. 2013.
(Continued)

*Primary Examiner* — Diane Mizrahi (57) ABSTRACT

A method for determining a priority of a mobile subscriber in a cellular network. The method is performed in a radio network node and comprises the steps of: obtaining a temporary mobile subscriber identity, TMSI, associated with a priority affecting event; storing the TMSI associated with the event, as at least part of an indication of priority; receiving a connection request from a wireless terminal of the mobile subscriber, the connection request comprising a
(Continued)

TMSI; and determining a priority of the wireless terminal based on whether the TMSI of the connection request matches a stored TMSI or not.

12 Claims, 3 Drawing Sheets

(51) Int. Cl.
  *H04W 76/04* (2009.01)
  *H04W 72/10* (2009.01)
  *H04W 8/18* (2009.01)
  *H04W 8/26* (2009.01)
  *H04W 68/00* (2009.01)

(52) U.S. Cl.
  CPC ......... *H04W 72/042* (2013.01); *H04W 72/10* (2013.01); *H04W 76/046* (2013.01)

(56) References Cited

U.S. PATENT DOCUMENTS

| | | | | |
|---|---|---|---|---|
| 9,467,901 | B2* | 10/2016 | Better | H04W 68/08 |
| 2002/0111159 | A1* | 8/2002 | Faccin | H04M 3/5116 |
| | | | | 455/445 |
| 2012/0295643 | A1 | 11/2012 | Arvidsson et al. | |
| 2016/0192420 | A1* | 6/2016 | Kim | H04W 74/00 |
| | | | | 370/329 |
| 2016/0198349 | A1* | 7/2016 | Fox | H04W 28/08 |
| | | | | 455/422.1 |

FOREIGN PATENT DOCUMENTS

| | | |
|---|---|---|
| WO | 2014048085 A1 | 4/2014 |
| WO | 2014110709 A1 | 7/2014 |

OTHER PUBLICATIONS

3GPP TS 36.331 V9.16.0, 3rd Generation Partnership Project; Technical Specification Group Radio Access Network; Evolved Universal Terrestrial Radio Access (E-UTRA); Radio Resource Control (RRC); Protocol specification (Release 9), Sep. 2013.

3GPP TS 36.413 V10.7.0, 3rd Generation Partnership Project; Technical Specification Group Radio Access Network; Evolved Universal Terrestrial Radio Access Network (E-UTRAN); S1 Application Protocol (S1AP) (Release 10), Dec. 2013.

3GPP TS 23.401 V9.15.0, 3rd Generation Partnership Project; Technical Specification Group Services and System Aspects; General Packet Radio Service (GPRS) enhancements for Evolved Universal Terrestrial Radio Access Network (E-UTRAN) access (Release 9), Mar. 2013.

* cited by examiner

METHOD AND APPARATUSES FOR DETERMINING PRIORITY OF A WIRELESS TERMINAL

This application is a 371 of International Application No. PCT/SE2014/050820, filed Jun. 30, 2014, the disclosure of which is fully incorporated herein by reference.

TECHNICAL FIELD

The invention relates to a method, a radio network node, a computer program and a computer program product for determining a priority of a mobile subscriber in a cellular network.

BACKGROUND

Cellular communication networks evolve towards higher data rates, improved capacity and coverage. In the 3rd Generation Partnership Project (3GPP) standardization body, several technologies have been and are also currently being developed.

LTE (Long Term Evolution) is a recent standardised technology. It uses an access technology based on OFDM (Orthogonal Frequency Division Multiplexing) for the downlink and Single Carrier FDMA (SC-FDMA) for the uplink. The resource allocation to wireless terminals (also known as user equipment, UEs) on both downlink and uplink is generally performed adaptively using fast scheduling, taking into account the instantaneous traffic pattern and radio propagation characteristics of each wireless terminal.

However, available resources benefit from being used as efficiently as possible, particularly in the case when a wireless terminal requests access to the network. It would be beneficial if there were to be a way in which requests for access to the network are prioritised in a better way than in the prior art.

SUMMARY

It is an object to provide a way in which requests for access to the network are prioritised in a better way than in the prior art.

According to a first aspect, it is presented a method for determining a priority of a mobile subscriber in a cellular network. The method is performed in a radio network node and comprises the steps of: obtaining a temporary mobile subscriber identity, TMSI, associated with a priority affecting event; storing the TMSI associated with the event, as at least part of an indication of priority; receiving a connection request from a wireless terminal of the mobile subscriber, the connection request comprising a TMSI; and determining a priority of the wireless terminal based on whether the TMSI of the connection request matches a stored TMSI or not.

The step of storing may comprise storing a time stamp in association with the TMSI associated with the event. In such a case, the method further comprises the step of: removing stored TMSI records older than a threshold age.

The step of receiving a connection request may comprise receiving a radio resource control connection request.

In the step of obtaining a TMSI, the priority affecting event may be receiving a downlink paging message comprising a TMSI for the mobile subscriber, the downlink paging message comprising a page request of a circuit switched core network. In such a case, the step of storing the TMSI comprises indicating when the downlink paging message comprises a page request of a circuit switched core network; and the step of determining a priority comprises determining a high priority when a matching stored TMSI is stored as a page request of a circuit switched core network.

The step of storing the TMSI may comprise only storing the TMSI when the paging message comprises a page request of a circuit switched core network.

The method may further comprise the step of: transmitting a radio resource control paging message comprising the TMSI of the received downlink paging message.

In the step of obtaining a TMSI, the priority affecting event may be receiving a downlink paging message comprising a TMSI for the mobile subscriber, the downlink paging message comprising a paging priority. In such a case, the step of storing the TMSI comprises storing the paging priority; and the step of determining a priority comprises determining a high priority when a matching stored TMSI is stored with a high paging priority.

In the step of obtaining a TMSI, the priority affecting event may be performing a network determined connection release, the release comprising a TMSI for the mobile subscriber. In such a case, the step of storing the TMSI comprises indicating when the network determined connection release is performed; and the step of determining a priority comprises determining a low priority when a matching stored TMSI is stored as an indicator of the network determined connection release.

The method may further comprise the step of: transmitting a connection reject message when the determined priority results in a rejection, the connection reject message comprising a wait time, indicating to the wireless terminal to refrain from connecting for a duration of the wait time.

According to a second aspect, it is presented a radio network node for determining a priority of a mobile subscriber in a cellular network. The radio network node comprises: a processor; and a memory storing instructions that, when executed by the processor, causes the radio network node to: obtain a temporary mobile subscriber identity, TMSI, associated with a priority affecting event; store the TMSI associated with the event, as at least part of an indication of priority; receive a connection request from a wireless terminal of the mobile subscriber, the connection request comprising a TMSI; and determine a priority of the wireless terminal based on whether the TMSI of the connection request matches a stored TMSI or not.

The instructions to store may comprise instructions that, when executed by the processor, causes the radio network node to store a time stamp in association with the TMSI associated with the event; in which case the memory further comprises instructions that, when executed by the processor, causes the radio network node to remove stored TMSI records older than a threshold age.

The instructions to receive a connection request may comprise instructions that, when executed by the processor, causes the radio network node to receive a radio resource control connection request.

The priority affecting event may be receiving a downlink paging message comprising a TMSI for the mobile subscriber, the downlink paging message comprising a page request of a circuit switched core network. In such a case, the instructions to store the TMSI comprise instructions that, when executed by the processor, causes the radio network node to indicate when the downlink paging message comprises a page request of a circuit switched core network; and the instructions to determine a priority comprise instructions that, when executed by the processor, causes the radio network node to determine a high priority when a matching stored TMSI is stored as a page request of a circuit switched core network.

The instructions to store the TMSI may comprise instructions that, when executed by the processor, causes the radio network node to only store the TMSI when the paging message comprises a page request of a circuit switched core network.

The memory may further comprise instructions that, when executed by the processor, causes the radio network node to transmit a radio resource control paging message comprising the TMSI of the received downlink paging message.

The priority affecting event may be receiving a downlink paging message comprising a TMSI for the mobile subscriber, the downlink paging message comprising a paging priority. In such a case, the instructions to store the TMSI comprise instructions that, when executed by the processor, causes the radio network node to store the paging priority; and the instructions to determine a priority comprise instructions that, when executed by the processor, causes the radio network node to determine a high priority when a matching stored TMSI is stored with a high paging priority.

The priority affecting event may be performing a network determined connection release, the release comprising a TMSI for the mobile subscriber. In such a case, the instructions to store the TMSI comprise instructions that, when executed by the processor, causes the radio network node to indicate when the network determined connection release is performed; and the instructions to determine a priority comprise instructions that, when executed by the processor, causes the radio network node to determine a low priority when a matching stored TMSI is stored as an indicator of the network determined connection release.

The memory may further comprise instructions that, when executed by the processor, causes the radio network node to: transmit a connection reject message when the determined priority results in a rejection, the connection reject message comprising a wait time, indicating to the wireless terminal to refrain from connecting for a duration of the wait time.

According to a third aspect, it is presented a radio network node comprising: means for obtaining a temporary mobile subscriber identity, TMSI, associated with a priority affecting event; means for storing the TMSI associated with the event, as at least part of an indication of priority; means for receiving a connection request from a wireless terminal of a mobile subscriber, the connection request comprising a TMSI; and means for determining a priority of the wireless terminal based on whether the TMSI of the connection request matches a stored TMSI or not.

According to a fourth aspect, it is presented a computer program for determining a priority of a mobile subscriber in a cellular network. The computer program comprises computer program code which, when run on a radio network node causes the radio network node to: obtain a temporary mobile subscriber identity, TMSI, associated with a priority affecting event; store the TMSI associated with the event, as at least part of an indication of priority; receive a connection request from a wireless terminal of the mobile subscriber, the connection request comprising a TMSI; and determine a priority of the wireless terminal based on whether the TMSI of the connection request matches a stored TMSI or not.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
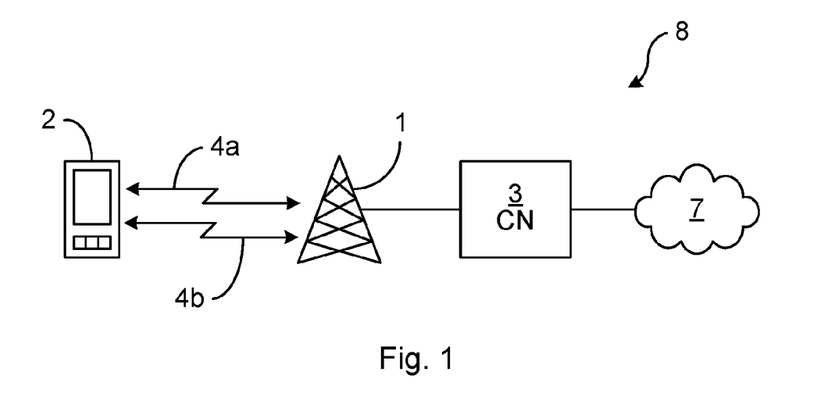
FIG. 1 is a schematic diagram illustrating a cellular communication network where embodiments presented herein may be applied.

FIG. 1 is a schematic diagram illustrating a cellular communication network 8 where embodiments presented herein may be applied. The cellular communication network 8 comprises a core network 3 and one or more radio network nodes 1, here in the form of radio base stations being evolved Node Bs, also known as eNode Bs or eNBs. The radio network node 1 could also be in the form of Node Bs, BTSs (Base Transceiver Stations) and/or BSSs (Base Station Subsystems), etc. The radio network node 1 provides radio connectivity over a wireless interface 4a-b to a plurality of wireless terminals 2. The term wireless terminal is also known as mobile communication terminal, user equipment (UE), mobile terminal, user terminal, user agent, wireless device, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless terminal 2 can comprise a number of wires for internal and/or external purposes.

The cellular communication network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Over the wireless interface, uplink (UL) communication 4a occurs from the wireless terminal 2 to the radio network node 1 and downlink (DL) communication 4b occurs from the radio network node 1 to the wireless terminal 2. The quality of the wireless radio interface to each wireless terminal 2 can vary over time and depending on the position of the wireless terminal 2, due to effects such as fading, multipath propagation, interference, etc.

The radio network node 1 is also connected to the core network 3 for connectivity to central functions and a wide area network 7, such as the Internet.

Figure 2:
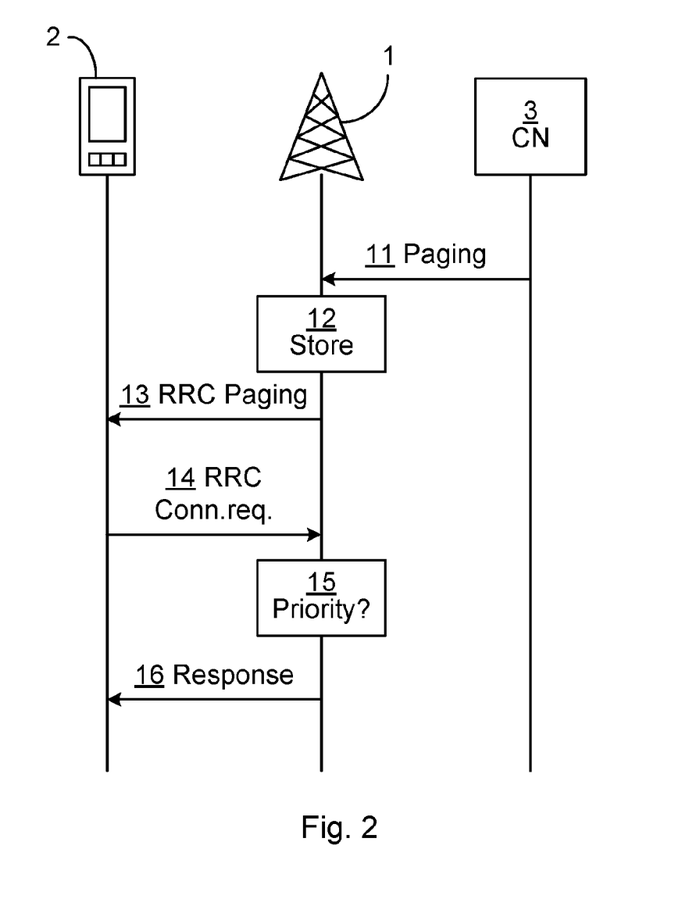
FIG. 2 is a sequence diagram illustrating an embodiment where priority is determined in a paging sequence in the cellular network of FIG. 1.

FIG. 2 is a sequence diagram illustrating an embodiment where priority is determined in a paging sequence in the cellular network of FIG. 1. In this embodiment, the wireless terminal 2 camps on the network of the radio network node 1. However, the radio network node 1 here does not directly support circuit switched (CS) connections, whereby the wireless terminal 2 would need to switch to another radio access technology (RAT) in order to connect using a CS connection. In the prior art, this is an issue when resource utilisation is high, since the wireless terminal needs to first connect to the radio network node 1 to be able to switch to the CS supporting network. The radio network node 1 is unable to distinguish connection requests for a circuit switched connection from other connection requests, whereby the probability of rejecting a connection request for a circuit switched connection (e.g. for an incoming voice call or SMS message) will be the same as that of rejecting a regular packet switched connection request. However, with the solutions presented herein, this issue is mitigated.

Looking now to FIG. 2, the core network 3, such as an MME (Mobility Management Entity) node of the core network 3, first sends a downlink paging message 11 to the radio network node 1. The downlink paging message 11 can e.g. be an Si-MME paging message. The downlink paging message 11 comprises a temporary mobile subscriber identity (TMSI) for identification of the subscribers identity by the MME, without revealing the subscribers identity. For instance, the TMSI can be an S-TMSI (System Architecture Evolution TMSI), or any other suitable temporary identifier of the subscriber. The downlink paging message 11 comprises an indicator of a circuit switched network (e.g. in an information element core network domain="CS"). This implies that the targeted subscriber (or more accurately its wireless terminal), should connect to a circuit switched network, such as W-CDMA or GSM. For example, the downlink paging message 11 can in this way indicate circuit switched fallback, e.g. due to an incoming voice call or SMS (Short Messaging Service) message to the subscriber, which the network to which the wireless terminal in question camps to does not support. The wireless terminal thus would need to connect to a circuit switched network to receive the incoming voice call or SMS message.

The radio network node 1 stores 12 the TMSI of the downlink paging message 11 with an association to the circuit switched paging event, to be used for future prioritisation.

The radio network node 1 then sends an RRC (Radio Resource Control) paging message 13 to the wireless terminal 2 of the subscriber. The RRC paging message 13 comprises the TMSI from the downlink paging message 11.

The wireless terminal 2 receives the RRC paging message 13, and when the TMSI matches the TMSI of the wireless terminal 2, the wireless terminal 2 sends an RRC connection request 14 to the radio network node 1. The RRC connection request 14 also comprises the TMSI.

At this stage, the radio network node 1 determines a priority 15 for the incoming RRC connection request 14. This is done by checking if the TMSI of the RRC connection request has been stored due to a previous circuit switched paging message. When the TMSI has been stored due to previous circuit switched paging message, this results in a higher priority.

The radio network node 1 then sends a response 16 to the RRC connection request 14, being positive (e.g. RRC connection setup) or negative (e.g. RRC connection reject), depending at least partly on the prioritisation.

In this way, a connection request due to circuit switched paging is prioritised, which reduces the risk of an incoming voice call or SMS being rejected due to lack of resources in the non-CS network. In most cases, such a prioritisation is not particularly costly, since soon after the connection is set up, there is a fallback to the CS network, thereby releasing resources again in the non-CS network.

Figure 3:
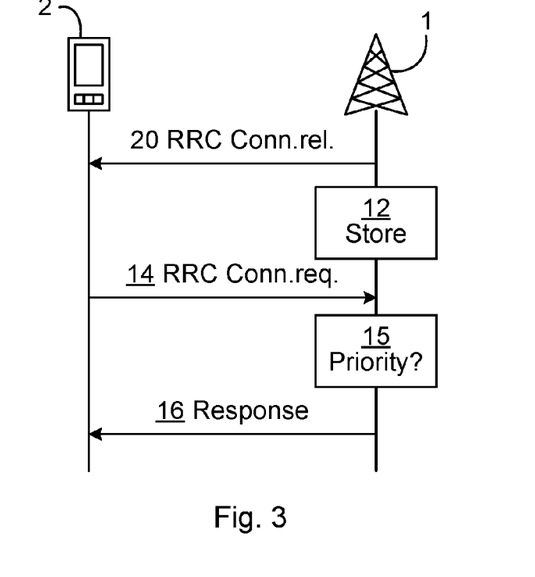
FIG. 3 is a sequence diagram illustrating an embodiment where priority is determined in a connection release sequence in the cellular network of FIG. 1.

FIG. 3 is a sequence diagram illustrating an embodiment where priority is determined in a connection release sequence in the cellular network of FIG. 1.

Here the radio network node 1 effects an RRC connection release 20 to the wireless terminal 2. The release can be determined by the radio network node 1 itself or due to signaling from higher layers.

The radio network node 1 stores 12 the TMSI of the RRC connection release message 20 with an association to the connection release, to be used for future prioritisation.

After the RRC connection release 20, the wireless terminal 1 disconnects from the radio network node 1. Soon after, however, the wireless terminal 1 will most likely attempt to reconnect, by sending an RRC connection request 14 to the radio network node 1.

At this stage, the radio network node 1 determines a priority 15 for the incoming RRC connection request 14. This is done by checking if the TMSI of the RRC connection request has been stored due to a previous RRC connection release. When the TMSI has been stored due to a previous RRC connection release, this results in a lower priority.

The radio network node 1 then sends a response 16 to the RRC connection request 14, being positive or negative, depending at least partly on the prioritisation. Optionally, when the response is negative and an RRC connection reject message is sent as a response 16, the RRC connection reject message comprises a wait time, whereby the wireless terminal refrains from reconnecting again for the duration of the wait time.

Through this procedure, the wireless terminal is prevented from reconnecting during the wait time, even when the connection release is determined by the network side. In the prior art, such a wait time is not possible, since the RRC connection release message does not support wait time.

Figure 4A:
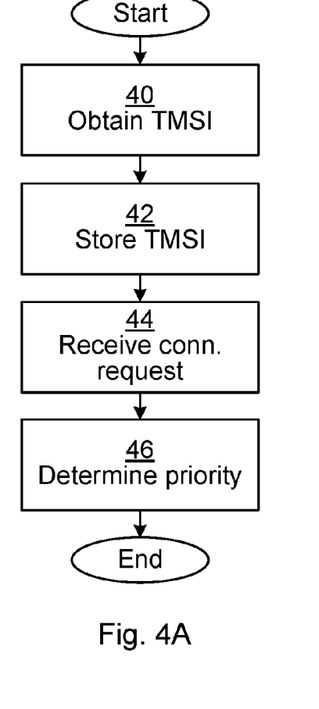
FIGS. 4A-B are flow charts illustrating embodiments of methods for determining priority in the cellular network of FIG. 1.
Figure 4B:
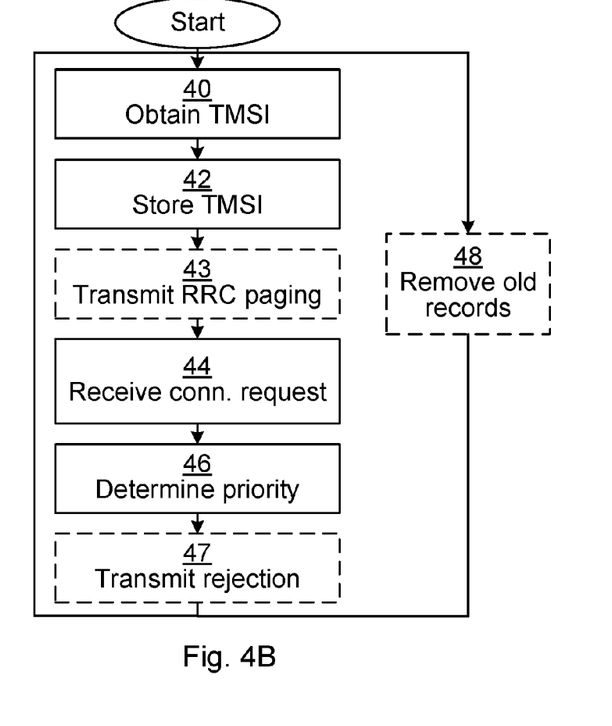

FIGS. 4A-B are flow charts illustrating embodiments of methods for determining priority of a mobile subscriber in the cellular network of FIG. 1. The methods are performed in the radio network node 1 of FIG. 1. First, the method illustrated in FIG. 4A will be described.

In an obtain TMSI step 40, a temporary mobile subscriber identity, TMSI, associated with a priority affecting event is obtained.

In a paging embodiment, corresponding to the sequence illustrated in FIG. 2 and described above, the priority affecting event is receiving a downlink paging message. The paging message then comprises a TMSI for the mobile subscriber to be paged. Moreover, the downlink paging message comprises a page request of a circuit switched core network, e.g. for circuit switched fallback to receive an incoming voice call or SMS (short messaging service) message. Optionally, the downlink paging message comprises a paging priority.

In a connection release embodiment, corresponding to the sequence illustrated in FIG. 3 and described above, the priority affecting event is performing a network determined connection release. The release then comprises a TMSI for the mobile subscriber.

In a store TMSI step 42, the TMSI is stored associated with the event, as at least part of an indication of priority. Optionally, the stored TMSI is part of a record also comprising a time stamp, to allow removal of old records once they are obsolete. Obsolete can e.g. be defined as older than a threshold duration.

In the paging embodiment, this step comprises indicating when the downlink paging message comprises a page request of a circuit switched core network. If this method is only used for the paging embodiment, this can be indicated by simply storing the TMSI in a specific database, whereby any stored TMSI is an indication of page request of a circuit switched core network for the TMSI in question. In other words, the TMSI is only stored then when the paging message comprises a page request of a circuit switched core network. Alternatively, the TMSI can be stored in a record also comprising a specific indicator of a page request of a circuit switched core network, such as a predetermined parameter value for this purpose. Optionally, the paging priority of the downlink paging message is also stored in the record with the TMSI.

In the connection release embodiment, this step comprises storing the TMSI when the network determined connection release is performed. If this method is only used for the connection release embodiment, this can be indicated by simply storing the TMSI in a specific database, whereby any stored TMSI is an indication of the network determined connection release for the TMSI in question. Alternatively, the TMSI can be stored in a record also comprising a specific indicator of a network determined connection release, such as a predetermined parameter value for this purpose.

In a receive connection request step 44, a connection request is received from a wireless terminal of the mobile subscriber. The connection request comprises a TMSI. For instance, the connection request can be an RRC connection request.

In a determine priority step 46, a priority of the wireless terminal is determined based on whether the TMSI of the connection request matches a stored TMSI or not.

In the paging embodiment, this step comprises determining a high priority when a matching stored TMSI is stored as a page request of a circuit switched core network. In this way, circuit switched paging is prioritised, which reduces the risk of an incoming voice call or SMS being rejected due to lack of resources. Optionally, the paging priority is used in this step, such that a first wireless terminal with a TMSI being associated with a first paging priority is given higher priority than a second wireless terminal with a TMSI being associated with a second paging priority, when the first paging priority is higher than the second paging priority (all else equal).

In the connection release embodiment, this step comprises determining a low priority when a matching stored TMSI is stored as an indicator of the network determined connection release. In this way, any attempts from a wireless terminal to reconnect, after its connection being released by the network, are down prioritised.

Now, the method illustrated in FIG. 4B will be described. Only new or modified steps, compared to the method of FIG. 4A, will be described here.

For the paging embodiment, there is here an optional transmit RRC paging step 43, in which an RRC paging message is transmitted. The RRC paging message comprises the TMSI of the received paging message.

For the connection release embodiment, there is here an optional transmit rejection step 47. In this step, a connection reject message is transmitted when the determined priority results in a rejection. The connection reject message comprises a wait time, indicating to the wireless terminal to refrain from connecting for a duration of the wait time.

In an optional remove old records step 48, stored TMSI records which are older than a threshold age are removed. This step may optionally be performed in a separate process from the other steps of the method.

Figure 5:
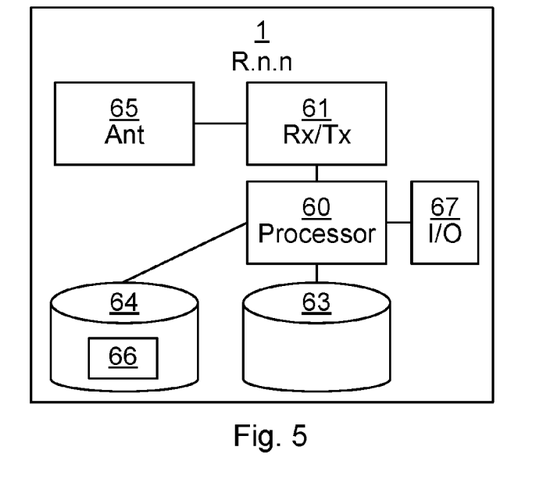
FIG. 5 is a schematic diagram showing some components of the radio network node of FIG. 1.

FIG. 5 is a schematic diagram showing some components of the radio network node 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIGS. 4A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM). For example, the data memory 63 can store one or more TMSIs associated with priority affecting events.

The radio network node 1 further comprises an I/O interface 67 for communicating with other external entities. Optionally, the I/O interface 67 also includes a user interface.

The radio network node 1 also comprises one or more transceivers 61, comprising analogue and digital components, and a suitable number of antennas 65 for wireless communication with wireless terminals as shown in FIG. 1.

Other components of the radio network node 1 are omitted in order not to obscure the concepts presented herein.

Figure 6:
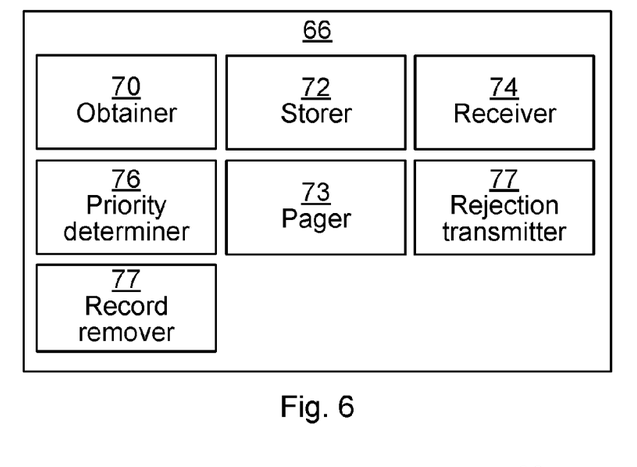
FIG. 6 is a schematic diagram showing functional modules of the software instructions of the radio network node of FIG. 5 according to one embodiment.

FIG. 6 is a schematic diagram showing functional modules of the software instructions 66 of the radio network node of FIG. 5 according to one embodiment. The modules are implemented using software instructions such as a computer program executing in the radio network node 1. The modules correspond to the steps in the methods illustrated in FIGS. 4A-B.

An obtainer 70 is configured to obtain a TMSI associated with a priority affecting event. This module corresponds to the obtain TMSI step 40 of FIGS. 4A-B.

A storer 72 is configured to store the TMSI associated with the event, as at least part of an indication of priority. This module corresponds to the store TMSI step 42 of FIGS. 4A-B.

A receiver 74 is configured to receive a connection request from a wireless terminal of the mobile subscriber, the connection request comprising a TMSI. This module corresponds to the receive connection request step 44 of FIGS. 4A-B.

A priority determiner 76 is configured to determine a priority of the wireless terminal based on whether the TMSI of the connection request matches a stored TMSI or not. This module corresponds to the determine priority step 46 of FIGS. 4A-B.

A pager 73 is configured to transmit a RRC paging message comprising the TMSI of the paging message. This module corresponds to the transmit RRC paging step 43 of FIG. 4B.

A rejection transmitter 77 is configured to transmit a connection reject message when the determined priority results in a rejection. This module corresponds to the transmit rejection step 47 of FIG. 4B.

A record remover 78 is configured to remove stored TMSI records older than a threshold age. This module corresponds to the remove old records step 48 of FIG. 4B.

Figure 7:
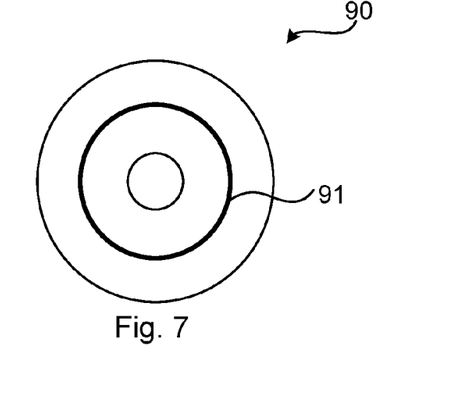
FIG. 7 shows one example of a computer program product comprising computer readable means.

FIG. 7 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining a priority of a mobile subscriber in a cellular network, the method being performed in a radio network node and comprising the steps of:
obtaining a temporary mobile subscriber identity, TMSI, associated with a priority affecting event for the mobile subscriber;
storing the TMSI associated with the event, as at least part of an indication of priority;
receiving a connection request from a wireless terminal of the mobile subscriber, the connection request comprising a TMSI;
determining a priority of the wireless terminal based on whether the TMSI of the connection request matches the stored TMSI or not;
wherein in the step of obtaining a TMSI, the priority affecting event is receiving a downlink paging message comprising a TMSI for the mobile subscriber, and the downlink paging message comprises a page request of a circuit switched core network;
the step of storing the TMSI comprises indicating when the downlink paging message comprises a page request of a circuit switched core network; and,
the step of determining a priority comprises transforming the connection request to a high priority connection request when a matching stored TMSI is stored as a page request of a circuit switched core network.

2. The method according to claim 1, wherein the step of storing comprises storing a time stamp in association with the TMSI associated with the event; and wherein the method further comprises the step of:
removing stored TMSI records older than a threshold age.

3. The method according to claim 1, wherein the step of receiving a connection request comprises receiving a radio resource control connection request.

4. The method according to claim 1, wherein the step of storing the TMSI comprises only storing the TMSI when the paging message comprises a page request of a circuit switched core network.

5. The method according to claim 1, further comprising the step of:
transmitting a radio resource control paging message comprising the TMSI of the received downlink paging message.

6. A radio network node for determining a priority of a mobile subscriber in a cellular network, the radio network node comprising:
a processor; and
a memory storing instructions that, when executed by the processor, causes the radio network node to:
obtain a temporary mobile subscriber identity, TMSI, associated with a priority affecting event for the mobile subscriber;
store the TMSI associated with the event, as at least part of an indication of priority;
receive a connection request from a wireless terminal of the mobile subscriber, the connection request comprising a TMSI;
determine a priority of the wireless terminal based on whether the TMSI of the connection request matches the stored TMSI or not;
the priority affecting event is receiving a downlink paging message comprising a TMSI for the mobile subscriber, the downlink paging message comprising a page request of a circuit switched core network;
the instructions to store the TMSI comprise instructions that, when executed by the processor, cause the radio network node to indicate when the downlink paging message comprises a page request of a circuit switched core network; and
the instructions to determine a priority comprise instructions that, when executed by the processor, transform the connection request to a high priority connection request when a matching stored TMSI is stored as a page request of a circuit switched core network.

7. The radio network node according to claim 6, wherein the instructions to store comprise instructions that, when executed by the processor, causes the radio network node to store a time stamp in association with the TMSI associated with the event; and wherein the memory further comprises instructions that, when executed by the processor, causes the radio network node to remove stored TMSI records older than a threshold age.

8. The radio network node according to claim 6, wherein the instructions to receive a connection request comprise instructions that, when executed by the processor, causes the radio network node to receive a radio resource control connection request.

9. The radio network node according to claim 6, wherein the instructions to store the TMSI comprise instructions that, when executed by the processor, causes the radio network node to only store the TMSI when the paging message comprises a page request of a circuit switched core network.

10. The radio network node according to claim 6, wherein the memory further comprises instructions that, when executed by the processor, causes the radio network node to transmit a radio resource control paging message comprising the TMSI of the received downlink paging message.

11. A radio network node for determining a priority of a mobile subscriber in a cellular network, the radio network node comprising:
   a processor; and
   a memory storing instructions that, when executed by the processor, causes the radio network node to:
      obtain a temporary mobile subscriber identity, TMSI, associated with a priority affecting event for the mobile subscriber;
      store the TMSI associated with the event, as at least part of an indication of priority;
      receive a connection request from a wireless terminal of the mobile subscriber, the connection request comprising a TMSI;
      determine a priority of the wireless terminal based on whether the TMSI of the connection request matches the stored TMSI or not;
      the priority affecting event is performing a network determined connection release, the network determined connection release comprising a TMSI for the mobile subscriber;
      the instructions to store the TMSI comprise instructions that, when executed by the processor, causes the radio network node to indicate when the network determined connection release is performed; and
      the instructions to determine a priority comprise instructions that, when executed by the processor, causes the radio network node to transform the connection request to a low priority connection request when a matching stored TMSI is stored as an indicator of the network determined connection release.

12. The radio network node according to claim 11, wherein the memory further comprises instructions that, when executed by the processor, causes the radio network node to:
   transmit a connection reject message when the determined priority results in a rejection, the connection reject message comprising a wait time, indicating to the wireless terminal to refrain from connecting for a duration of the wait time.

* * * * *